US011672047B2

(12) United States Patent
Chervyakov et al.

(10) Patent No.: US 11,672,047 B2
(45) Date of Patent: Jun. 6, 2023

(54) NETWORK BASED CRS MITIGATION

(71) Applicant: Apple Inc., Cupertino, CA (US)

(72) Inventors: Andrey Chervyakov, Nizhny Novgorod (RU); Jie Cui, Santa Clara, CA (US); Dmitry Belov, Nizhny Novgorod (RU); Yang Tang, San Jose, CA (US); Alexey Khoryaev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/638,328

(22) PCT Filed: Aug. 9, 2018

(86) PCT No.: PCT/US2018/046066
§ 371 (c)(1),
(2) Date: Feb. 11, 2020

(87) PCT Pub. No.: WO2019/032868
PCT Pub. Date: Feb. 14, 2019

(65) Prior Publication Data
US 2020/0275522 A1 Aug. 27, 2020

Related U.S. Application Data

(60) Provisional application No. 62/587,917, filed on Nov. 17, 2017, provisional application No. 62/544,260, filed on Aug. 11, 2017.

(51) Int. Cl.
H04W 88/06 (2009.01)
H04W 76/28 (2018.01)
(Continued)

(52) U.S. Cl.
CPC ........... *H04W 88/06* (2013.01); *H04L 5/0051* (2013.01); *H04L 5/10* (2013.01); *H04W 68/005* (2013.01);
(Continued)

(58) Field of Classification Search
USPC ........................................................ 370/329
See application file for complete search history.

(56) References Cited

U.S. PATENT DOCUMENTS

2012/0207126 A1* 8/2012 Qu ........................ H04L 5/0053
370/329
2013/0114496 A1* 5/2013 Mazzarese ............ H04L 5/0023
370/312
(Continued)

FOREIGN PATENT DOCUMENTS

CN 102468922 A * 5/2012
JP 6006336 B2 * 10/2016 ........... H04L 5/0055
(Continued)

OTHER PUBLICATIONS

Qualcom Incorporated; "Frequency domain CRS muting", 3GPP Draft: R1-1705014 Frequency domain CRS Muting, 3rd Generation Partnership Project (3GPP), vol. RAN WG1, No. Spokane, Washington, USA; Apr. 3, 2017; Apr. 2, 2017.
(Continued)

*Primary Examiner* — Jamaal Henson
(74) *Attorney, Agent, or Firm* — Fay Kaplun & Marcin, LLP

(57) ABSTRACT

An apparatus of a user equipment (UE), comprises one or more baseband processors to receive one or more subframes from a cell of a network, and to detect a Cell Specific Reference Signal (CRS) transmission pattern in the one or more subframes to determine whether CRS mitigation is used by the cell, wherein the one or more baseband proces-
(Continued)

sors are to adjust processing of the one or more subframes when CRS mitigation is used. The apparatus further includes a memory to store the one or more subframes.

17 Claims, 9 Drawing Sheets

(51) Int. Cl.
| | | |
|---|---|---|
| *H04W 76/27* | (2018.01) | |
| *H04L 5/00* | (2006.01) | |
| *H04L 5/10* | (2006.01) | |
| *H04W 68/00* | (2009.01) | |
| *H04W 72/0446* | (2023.01) | |
| *H04W 72/0453* | (2023.01) | |
| *H04W 74/08* | (2009.01) | |

(52) U.S. Cl.
CPC ... *H04W 72/0446* (2013.01); *H04W 72/0453* (2013.01); *H04W 74/0833* (2013.01); *H04W 76/27* (2018.02); *H04W 76/28* (2018.02)

(56) References Cited

U.S. PATENT DOCUMENTS

| | | | | |
|---|---|---|---|---|
| 2014/0112253 A1* | 4/2014 | Nagata | .................. | H04L 5/0094 |
| | | | | 370/328 |
| 2014/0204853 A1* | 7/2014 | Ko | ........................ | H04L 5/0048 |
| | | | | 370/329 |
| 2014/0248886 A1* | 9/2014 | Yamazaki | ............. | H04W 36/26 |
| | | | | 455/443 |
| 2015/0016419 A1* | 1/2015 | Kim | ...................... | H04W 48/14 |
| | | | | 370/331 |
| 2015/0222414 A1* | 8/2015 | Tabet | .................... | H04L 5/0073 |
| | | | | 370/350 |
| 2016/0197690 A1* | 7/2016 | Li | ....................... | H04L 25/0224 |
| | | | | 370/278 |
| 2016/0234706 A1* | 8/2016 | Liu | ........................ | H04W 24/08 |
| 2017/0005744 A1* | 1/2017 | Li | ........................ | H04W 24/02 |
| 2018/0279272 A1 | 9/2018 | Bhattad et al. | | |
| 2018/0288711 A1* | 10/2018 | Lagerqvist | .......... | H04W 52/143 |
| 2018/0302176 A1* | 10/2018 | Jeon | ...................... | H04L 5/0073 |
| 2018/0351714 A1* | 12/2018 | Zaki | ...................... | H04L 5/0048 |
| 2020/0067661 A1* | 2/2020 | Siomina | .................. | H04L 5/005 |
| 2020/0366450 A1* | 11/2020 | Kazmi | .................. | H04L 5/0098 |
| 2021/0226760 A1* | 7/2021 | Ye | ......................... | H04L 5/0007 |

FOREIGN PATENT DOCUMENTS

| | | | | | |
|---|---|---|---|---|---|
| KR | 20170019701 | | * | 2/2017 | |
| KR | 20170019701 A | | * | 2/2017 | |
| WO | WO-2012169799 A2 | | * | 12/2012 | ............... H04B 7/04 |
| WO | 2014/053076 | | | 4/2014 | |
| WO | 2016/076782 | | | 5/2016 | |
| WO | 2017/079574 | | | 5/2017 | |
| WO | 2018/175571 | | | 9/2018 | |

OTHER PUBLICATIONS

Intel Corporation: Network-based CRS mitigation impact on advanced receivers:, 3 GPP Draft; R4-1804177-NW CRS-IM Advrx Assistance, 3$^{rd}$ Generation Partnership Project (3GPP), vol. RAN WG4, No. Melbourne, Australia; Apr. 16, 2018; Apr. 6, 2018.
Ericsson, "Discussions on the impact of UE performance of legacy receiver under network CRS mitigation [online]", 3GPP R4-1707185, Aug. 10, 2017.
Ericsson, "Discussion on CRS muting [online]", 3 GPP R4-1705484, May 15, 2017.
Intel Corporation, Frequency domain CRS muting for efeMTC [online], 3GPP TSG RAN WG1 #88b, R1-1704695, Apr. 3, 2017, 4 sheets.
Samsung, DMRS Design Aspects [online], 3GPP TSG RAN WG1 #88, R1-1702974, Feb. 13, 2017, 3 sheets.
Pantech, Discussion on signaling methods for TDD UL-DL reconfiguration [online], 3GPP TSG RAN WG1 #72b, R1-131524, Apr. 15, 2013, 3 sheets.

* cited by examiner

NETWORK BASED CRS MITIGATION

CROSS-REFERENCE TO RELATED APPLICATIONS

The present application claims the benefit of U.S. Provisional Application No. 62/544,260 (AA2952-Z) filed Aug. 11, 2017 and the benefit of U.S. Provisional Application No. 62/587,917 filed Nov. 17, 2017. Said Application No. 62/544,260 and said Application No. 62/587,917 are hereby incorporated herein by reference in their entireties.

BACKGROUND

Network-based Cell Specific Reference Signal (CRS) mitigation functionality is planned to be introduced into the Third Generation Partnership Project (3GPP) Release 15 of the Long-Term Evolution (LTE) standard. The general idea of the network-based CRS mitigation is to allow evolved NodeB (eNB) to switch off or mute CRS signals transmissions in a subset of physical resource blocks (PRBs) in all or a subset of subframes. The criteria for CRS muting has not yet been determined, and the decision to switch on or off CRS transmission is expected to be left up to eNB.

In the case where network-based CRS mitigation is introduced, however, there may be certain impacts on radio resource management (RRM) and demodulation performance at the user equipment (UE) device. For example, if a neighboring cell applies CRS muting and the UE does not have information on this, the following impacts may be anticipated. First, the accuracy of reference signal received power (RSRP) measurements may substantially degrade when the UE performs wideband RSRP measurements. Second, Cell Specific Reference Signal Interference Mitigation (CRS-IM) may be negatively impacted in addition to a negative impact on the performance of advanced receivers depending on UE implementation including a negative impact on power consumption.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
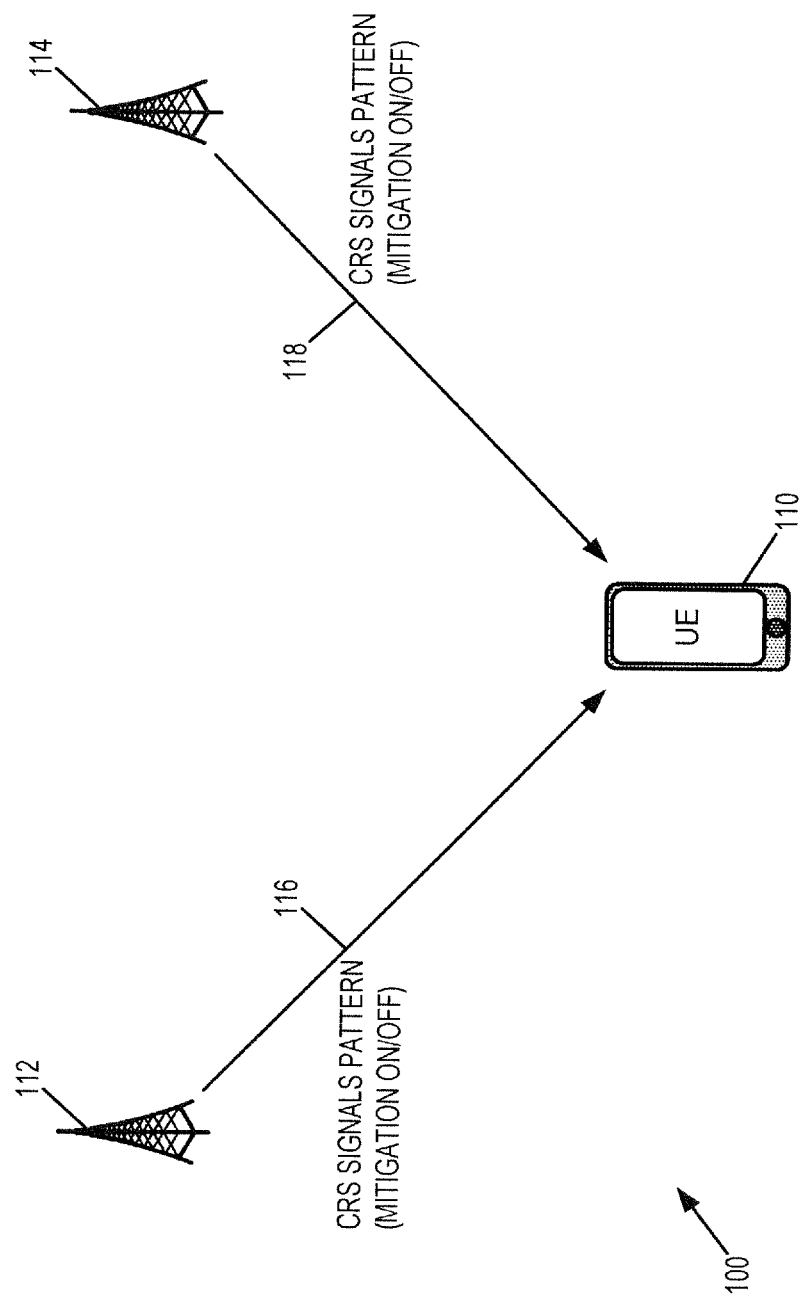
FIG. 1 is a diagram of a network that is capable of implementing Cell Specific Reference Signal (CRS) mitigation in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a diagram of a network that is capable of implementing Cell Specific Reference Signal (CRS) mitigation in accordance with one or more embodiments will be discussed. As shown in FIG. 1, network 100 may include an evolved NodeB (eNB) 112 that may provide a first serving cell for user equipment (UE) 110 and a neighboring eNB 114 to implement a neighboring cell. In network-based CRS mitigation, eNB 112 may transmit a CRS signals pattern 116 that is received by UE 110 wherein CRS mitigation may be on or CRS mitigation may be off. Likewise, neighboring eNB 114 may transmit a CRS signals pattern 118 that may be received by UE 110 wherein CRS mitigation may be on or CRS mitigation may be off.

In order to avoid a negative impact on the performance of UE 110, the UE 110 should have information whether the serving cell and/or one or more neighboring cells are using network-based CRS mitigation. As discussed in further detail herein, in some embodiments the UE may use autonomous detection or self-detection to determine whether network 100 is using network-based CRS mitigation. In such embodiments, the UE 110 may support dynamic tracking of the use or network-based CRS-mitigation in serving cell and/or one or more neighboring cells in order to avoid the overhead of network assistance. In other embodiments, a network-assistance process may be utilized to enable or disable detection of network-based CRS mitigation. In further embodiments, the UE 110 may adjust receiver demodulation and/or one or more radio resource management (RRM) algorithms to avoid negative impact from CRS muting being used in serving cell and/or one or more neighboring cells. Such embodiments may allow for simpler implementation by the UE and allow the UE to optimize its behavior and increase its performance. Examples of CRS signals patterns with CRS mitigation off and CRS mitigation on are shown in and described with respect to FIG. 2A and FIG. 2B, below.

Figure 2A:
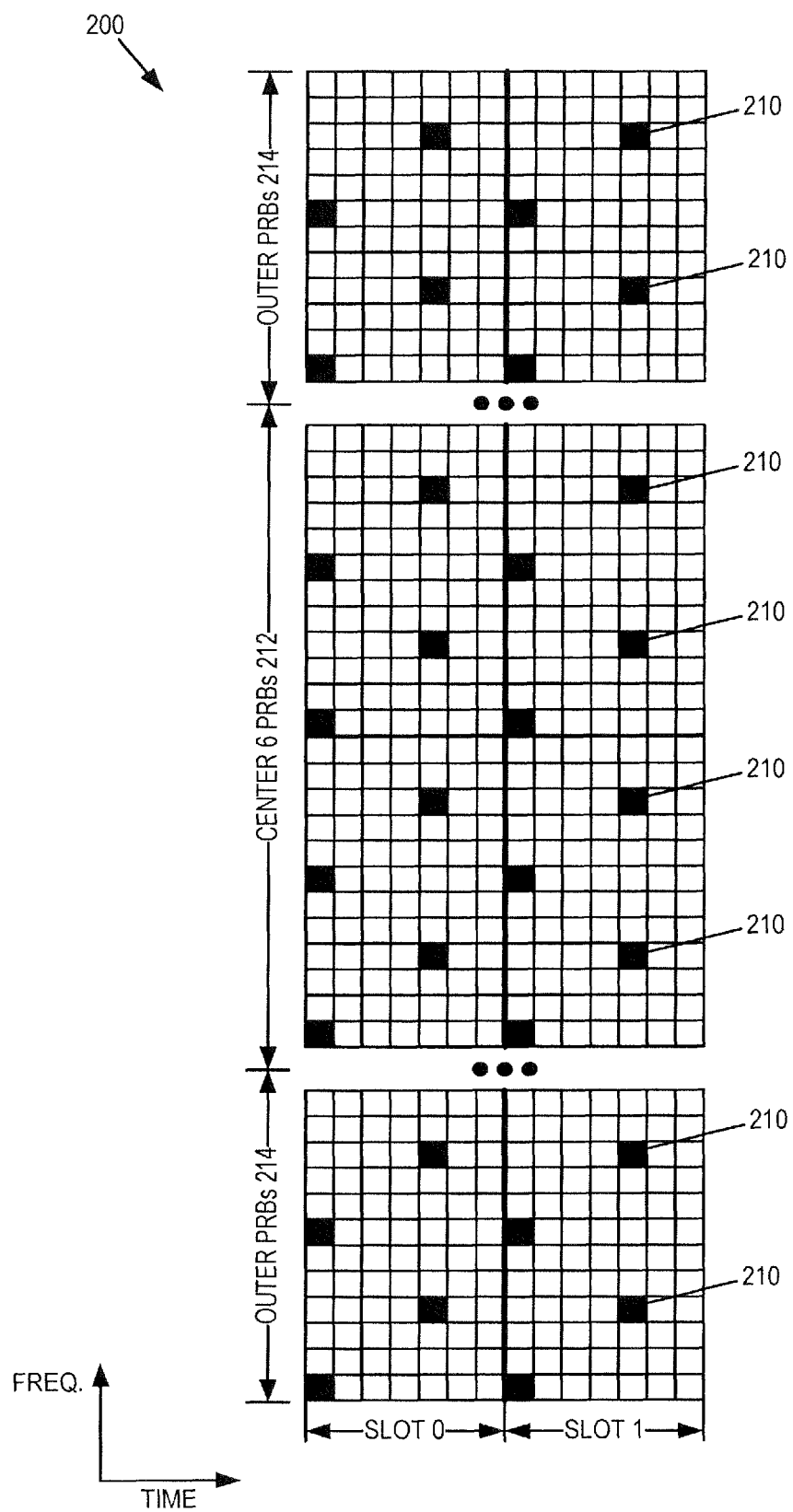
FIG. 2A and FIG. 2B are diagrams of CRS signals transmission patterns with CRS mitigation off and CRS mitigation on, respectively, in accordance with one or more embodiments.
Figure 2B:
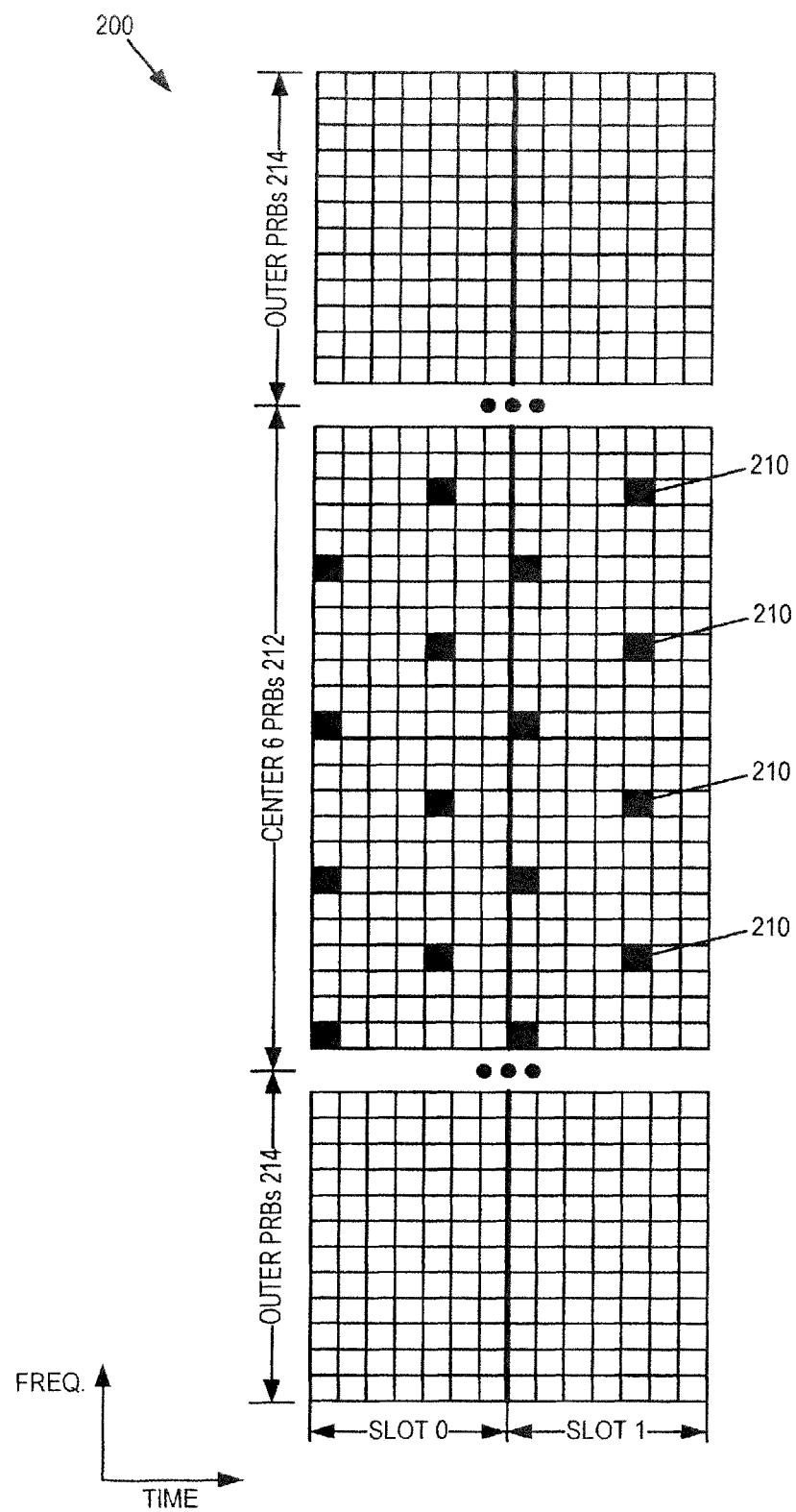

Referring now to FIG. 2A and FIG. 2B, diagrams of CRS signals transmission patterns with CRS mitigation off and CRS mitigation on, respectively, in accordance with one or more embodiments will be discussed. As shown in FIG. 2A, an example subframe 200 may include a number of CRS signals 210 distributed throughout the physical resource blocks (PRBs) of subframe 200 in Slot 0 and Slot 1 including having CRS signals 210 in the center 6 PRBs 212 and the outer PRBs 214 of subframe 200. The pattern of CRS signals 210 in subframe 200 may be a standard CRS pattern wherein CRS mitigation is off.

As shown in FIG. 2A, an example subframe 202 may include a number of CRS signals 210 distributed throughout the physical resource blocks (PRBs) of subframe 202. The pattern of CRS signals 210 in subframe 200 may be a pattern wherein CRS mitigation is on. In such an example arrangement wherein CRS mitigation is on, there are no CRS signals 210 in the outer PRBs 214 of subframe 202. In CRS mitigation, the CRS transmissions may be muted in all PRBs except the center 6 PRBs 212 which are typically used for radio resource management (RRM) related procedures, for example reference signal received power (RSRP) measurements. Thus, the patterns of CRS signals transmitted by a serving cell or by a neighboring cell may have CRS mitigation on as shown by example in subframe 200 of FIG. 2A or may have CRS mitigation off as shown by example in subframe 202 of FIG. 2B. The embodiments below discuss various procedures by which UE 110 may gain the knowledge of whether CRS mitigation is on or off.

Figure 3:
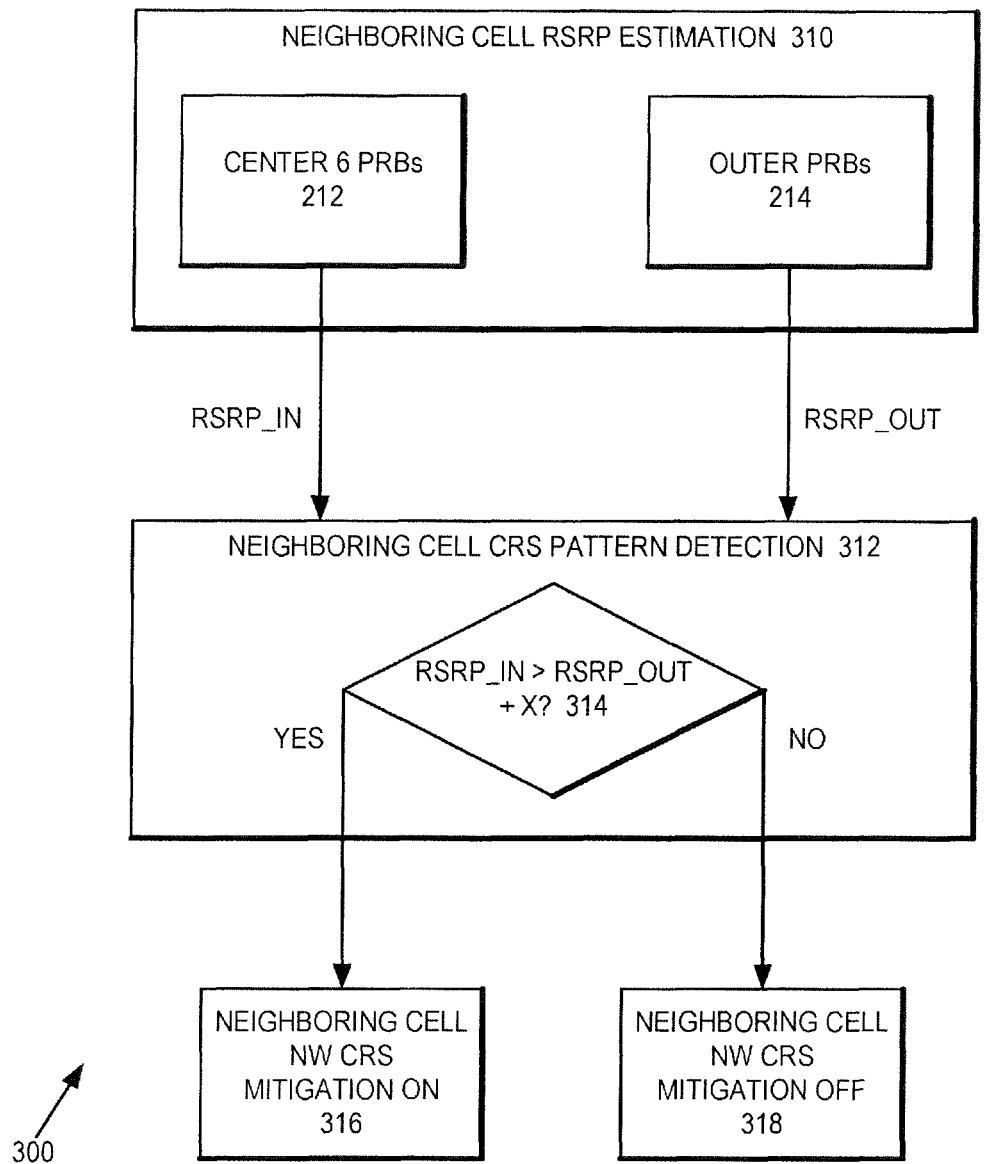
FIG. 3 is a diagram of autonomous neighboring cell CRS transmission pattern detection in accordance with one or more embodiments.

Referring now to FIG. 3, a diagram of autonomous neighboring cell CRS transmission pattern detection in accordance with one or more embodiments will be discussed. As shown in FIG. 3, the process 300 for detection of network-based CRS mitigation utilized by a cell of network 100 may be executed autonomously by UE 110. The UE 110 may perform autonomous detection of the CRS signals transmission pattern utilized by a neighboring cell (NC) or by serving cell (SC), which also may be referred to as self-detection. The UE 110 detect the NC CRS transmission pattern or the SC CRS transmission pattern using NC CRS receive signals processing or SC CRS receive signals processing and decides whether network-based CRS mitigation is used in the neighboring cell or in the serving cell in a particular subframe or in a set of subframes.

In one embodiment, at operation 310 the UE 110 performs a comparison of CRS reference signal received power (RSRP) in the center 6 PRBs 212 and in the outer PRBs 214. The UE estimates CRS RSRP in the center 6 PRBs 212, for example RSRP_IN, and UE 110 estimates CRS RSRP in the outer PRBs 214, for example RSRP_OUT. In a first option, set of outer PRBs 214 where estimation is done does not include the center 6 PRBs 214. In a second option, the set of outer PRBs 214 includes all PRBs as a wideband RSRP measurement. At operation 312, the UE 110 makes a decision on whether network-based CRS mitigation is applied based on RSRP comparison. A determination may be made at decision block 314 whether RSRP_IN is greater than RSRP_OUT+X dB. The margin of X dB is used to avoid a false detection of network-based CRS mitigation. If the determination is true (YES), then the UE 110 determines at operation 316 that the network-based mitigation for the neighboring cell is on. Otherwise, if the determination is false (NO), then the UE 110 determines at operation 318 that the network-based mitigation for the neighboring cell is off. It should be noted that process 300 may be applied to one or more subframes transmitted by a neighboring cell or eNB 114, and also may be extended for per-PRB CRS presence detection.

In another embodiment, a cross-correlation or a partial correlation may be performed on signals in the frequency domain. In this embodiment, the UE 110 receives a signal in the frequency domain and reconstructs the CRS signal in the frequency domain. Since measurement behavior is after cell identification and/or detection, the physical cell identifier (PCI) information of the target cell is already known by the UE 110, and the UE 110 may reconstruct the CRS signal. The reconstruction may be done as follows. The UE 110 generates the CRS sequence which is derived by the target PCI, and then maps the sequence to the frequency domain signal. Two types of signals may be considered. For CRS Signal 1, the signal can be generated for outer PRBs 214, namely all PRBs except the center 6 PRBs 212. The signals corresponding to center 6 PRBs 212 are nulled or punctured. For CRS Signal 2, the CRS signal is generated for full BW. The behavior of the UE 110 may be divided into two options.

In a first option, the UE 110 uses the reconstructed CRS Signal 1 and performs the cross-correlation or partial correlation with the modified receive signal. The modified received signal is the receive signal with nulled center 6 PRBs 212. If the cross-correlation peak is found, then CRS signals are present outside of the center 6 PRBs 212. In a second option, the UE 110 uses the reconstructed CRS Signal 2 and performs the cross-correlation or partial correlation with the full receive signal. If the cross-correlation peak is found and is above a threshold then CRS signals are present outside of the center 6 PRBs 212. Some particular embodiment of the correlation process may involve time offset compensation before applying cross-correlation.

In yet another embodiment, cross-correlation of signals in time domain may be performed. The UE 110 receives a signal in the time domain and reconstructs the CRS signal in the time domain. The time domain embodiment is substantially similar to the frequency domain embodiment, above, except that the cross-correlation is done for time domain signals, and the reconstructed CRS signal is converted to the time domain. In some particular embodiments, detection may be done separately for different neighboring cells and/or the serving cell. Detection also may be done separately for different component carriers in case of carrier aggregation (CA) operation. Autonomous detection by the UE 110 may be performed in each subframe or on a subset of subframes, for example every Nth subframe.

Figure 4:
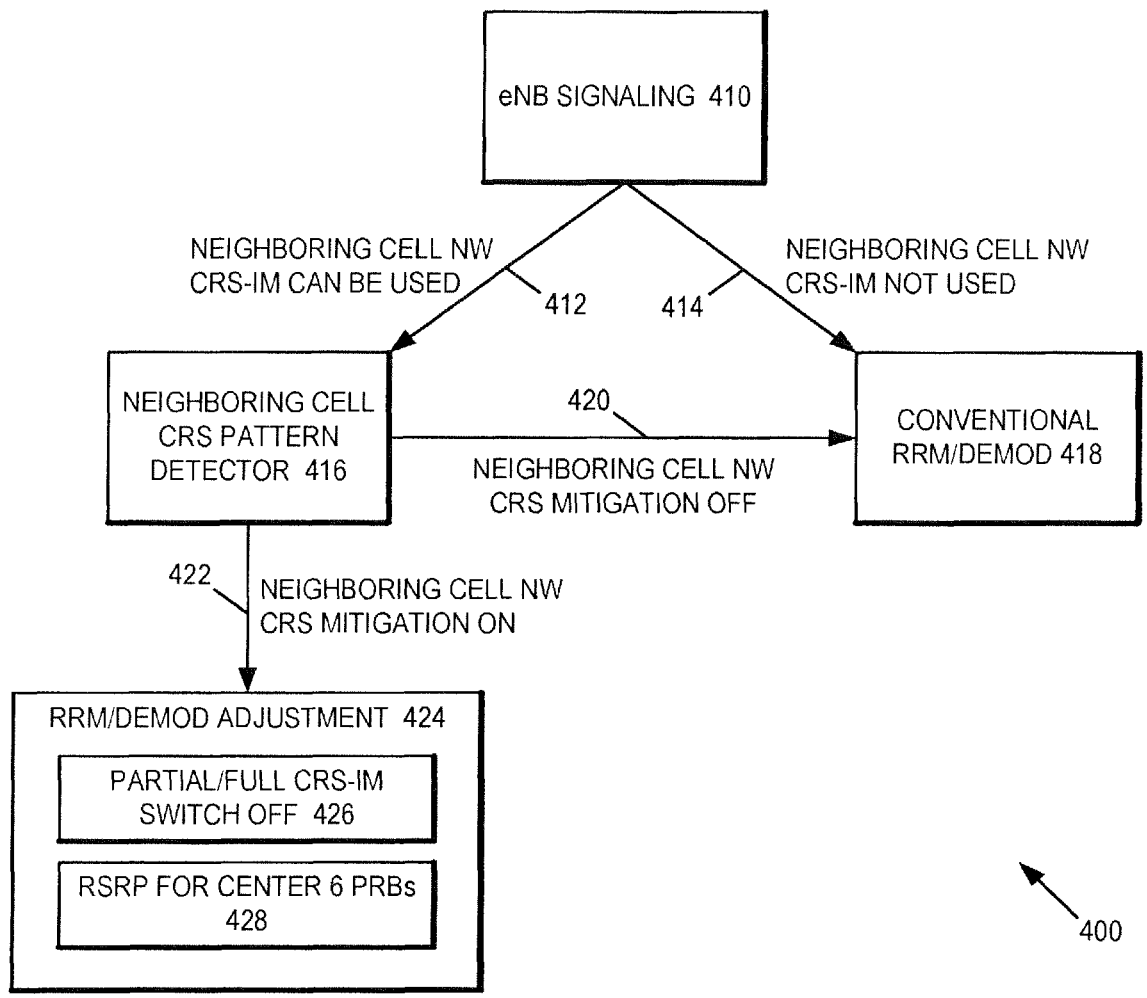
FIG. 4 is a diagram of user equipment (UE) behavior when eNB signaling is used to inform on network-controlled CRS muting in accordance with one or more embodiments.
Figure 5:
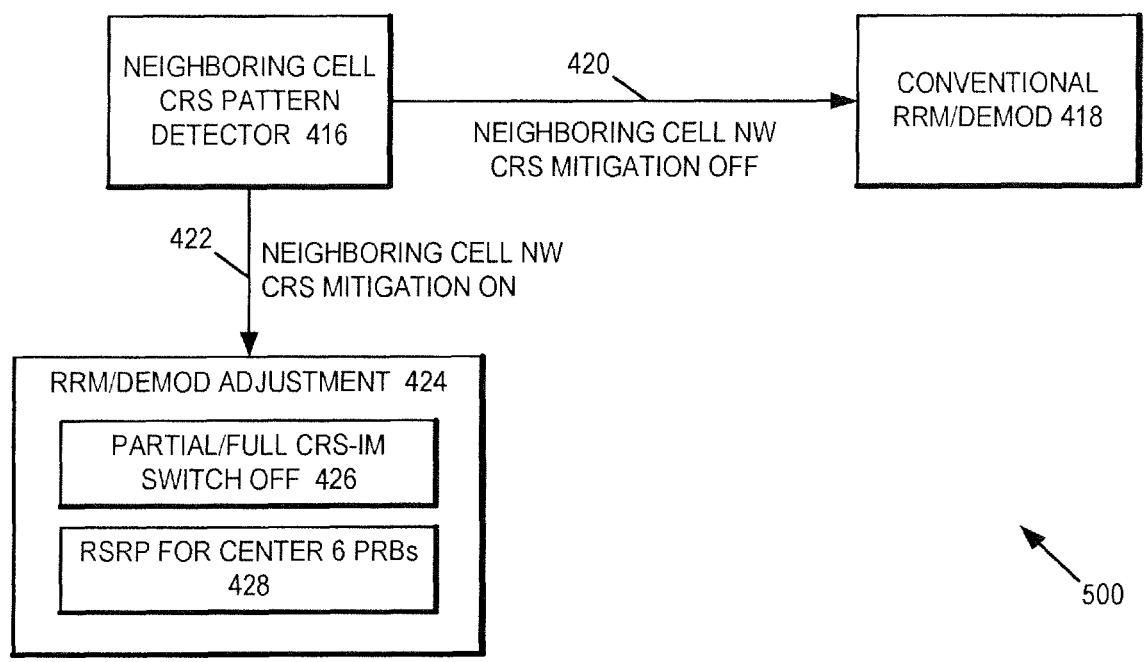
FIG. 5 is a diagram of user equipment (UE) behavior when network-controlled CRS pattern autonomous detection is always activated.

Referring now to FIG. 4 and FIG. 5, diagrams of user equipment (UE) behavior when eNB signaling is used to inform on network-controlled CRS muting and where network-controlled pattern autonomous detection is always activated will be discussed in accordance with one or more embodiments will be discussed. Another embodiment of CRS mitigation detection may be directed to network assistance for Cell Specific Reference Signal Interference Mitigation (CRS-IM). In general case, not all networks will be using network-based CRS mitigation and, hence, using autonomous detection of neighboring cell (NC) or serving cell (SC) CRS transmission pattern at the UE 110 side under all conditions may not be justified and may imply additional power consumption and processing complexity. Thus, as shown in process 400, the eNB such as eNB 112 or eNB 114 may indicate to the UE 10 information whether the neighboring cell or the serving cell are using network-based CRS mitigation. For example, as shown in FIG. 4 the eNB uses eNB signaling at operation 410 to inform the UE 110 at operation 412 that network-based CRS-IM can be used, for example at the neighboring cell or at the serving cell, or to inform the UE 110 at operation 414 that network-based CRS-IM is not used.

In a first option, such information can be provided in semi-static manner for example via radio resource control (RRC) signaling. The eNB indicates a possibility that network based CRS mitigation can be used. The eNB may dynamically switch on or off CRS transmissions based on its decisions. The eNB also may not guarantee that CRS muting is used. The eNB may provide information on the set of resources where CRS muting is used or may potentially be used, for example in a subset of subframes or in pattern of subframes. When the eNB informs the UE 110 that network-based CRS mitigation is not used at operation 414, the UE 110 follows legacy or conventional procedures at operation 418, for example conventional radio resource management (RRM) and/or demodulation. When the eNB informs the UE 110 at operation 412 that network-based CRS mitigation can be used, the UE 110 may activate autonomous detection process or pattern detector 416 for either the serving cell or one or more neighboring cells. The UE 110 may assume that network-based CRS mitigation is used and may adjust its behavior in terms of its assumptions on the presence of wideband CRS signals. If the neighboring cell network-based CRS-IM is turned off at operation 420, the UE 110 follows legacy or conventional procedures at operation 418, for example conventional radio resource management (RRM) and/or demodulation.

In a second option, information on neighboring cell or serving cell CRS muting may be provided in a dynamic manner. The eNB may inform the UE 110 on the exact set resources where CRS muting will be used by the network 100. The eNB may inform the UE 110 on the set of subframes where muting is applied. The eNB signaling may be provided to the UE 110 in a periodic manner, for example each X number of subframes. The eNB signaling 410 may be provided in downlink control information (DCI). The UE 110 may not need to activate CRS pattern detection for the indicated resource and may assume that CRS muting is applied in those subframes. Thus, eNB signaling 410 may be provided for each neighboring cell, or for each component carrier (CC) and for each neighboring cell. Common signaling may be applicable to all neighboring cells and signaling also may be provided for the serving cell.

The eNB also may inform the UE 110 on the CRS muting parameters used in the network 100. The eNB may inform the UE 110 on the maximum amount of warm up subframes and cool-down subframes which would be guaranteed by the network 100 before and/or after a certain set of events. A warm up subframe is the subframe with full bandwidth CRS before the event. A cool down subframe is the subframe with full bandwidth CRS after the event. The events may include any one or more of paging occasions (IDLE, Connected), system information (SI) reading window, paging transmission window (PTW) during extended discontinuous reception (eDRX), UE active time in Connected DRX (C-DRX), Positioning Reference Signal (PRS) transmissions, random access channel (RACH) occasions including RACH response (RAR) windows, and/or scheduling request transmissions.

The eNB signaling 410 of CRS muting patterns may be provided for all events jointly or for different events separately. The eNB signaling 410 may be carried by dedicated RRC signaling or by broadcasting, for example in a system information block (SIB). The maximum amount of warm up subframes and cool-down subframes may be associated with a set ID in the signaling, that is, the set ID may be associated with a predefined maximum amount of warm up subframes and cool-down subframes. The UE 110 may request the information of CRS muting from the eNB, for example a request whether CRS muting is used or not, or what is the maximum amount of warm up subframes and cool-down subframes which would be guaranteed by the network 100 before a certain set of events. The eNB signaling 410 may be provided for the serving cell and/or one or more neighboring cells.

A further embodiment may be directed to the behavior of the UE 110 to handle network-based CRS mitigation used by one or more neighboring cells. Once the UE 110 obtains information that the neighboring cell changes the CRS signal transmission pattern, that is the neighboring cell uses network-based CRS mitigation, the behavior of the UE 110 may be adjusted as follows to increase robustness towards CRS muting. If the neighboring cell uses network-based CRS mitigation, for example if the use is detected by the UE 110 as on at operation 422, the UE 110 can use optimized receive processing procedures related to the neighboring cell CRS processing such as RRM and/or demodulation adjustment. At operation 424, the UE 110 may adjust receiver algorithms for the neighboring cell CRS interference mitigation. For example, the UE may partially of fully switch off CRS-IM processing at operation 426 in PRBs without neighboring cell CRS interference or completely disable CRS-IM. It should be noted that CRS-IM mat be applied for the physical downlink shared channel (PDSCH) and also downlink (DL) Control channels processing with DL Control Channel IM Type A/B receivers. The behavior of other receivers like network assisted interference cancellation and suppression (NAICS) and DL Control Channel IM Type A/B may also be adjusted for the PRBs where CRS interference is not present, for example NAICS processing may be switched off.

The UE 110 may perform neighboring cell radio resource management (RRM) RRM measurements such as reference signal received power (RSRP) or reference signal received quality (RSRQ) using PRBs with CRS transmission only such as the center 6 PRBs at operation 428. The UE 110 may perform radio link monitoring (RLM) using PRBs with neighboring cell CRS transmission only. The UE 110 may perform time and/or frequency estimation for neighboring cell signals using CRS in the center 6 PRBs 212.

If the neighboring cell does not use network-based CRS mitigation, for example network-based CRS mitigation is not detected or is off at operation 420, the UE 110 may use legacy or conventional receive processing such as demodulation and/or RRM) at operation 418 which is related to the neighboring cell CRS processing. Taking into account possible network assistance, the following UE behavior may be considered. A first behavior of the UE 110 may be performed using process 400 of FIG. 4 wherein the UE 110 activates autonomous detection after eNB signaling 410 of information that network-based CRS mitigation can be used. A second behavior of the UE 100 may be performed using process 500 of FIG. 5 wherein the UE 110 always applies autonomous detection.

Figure 6:
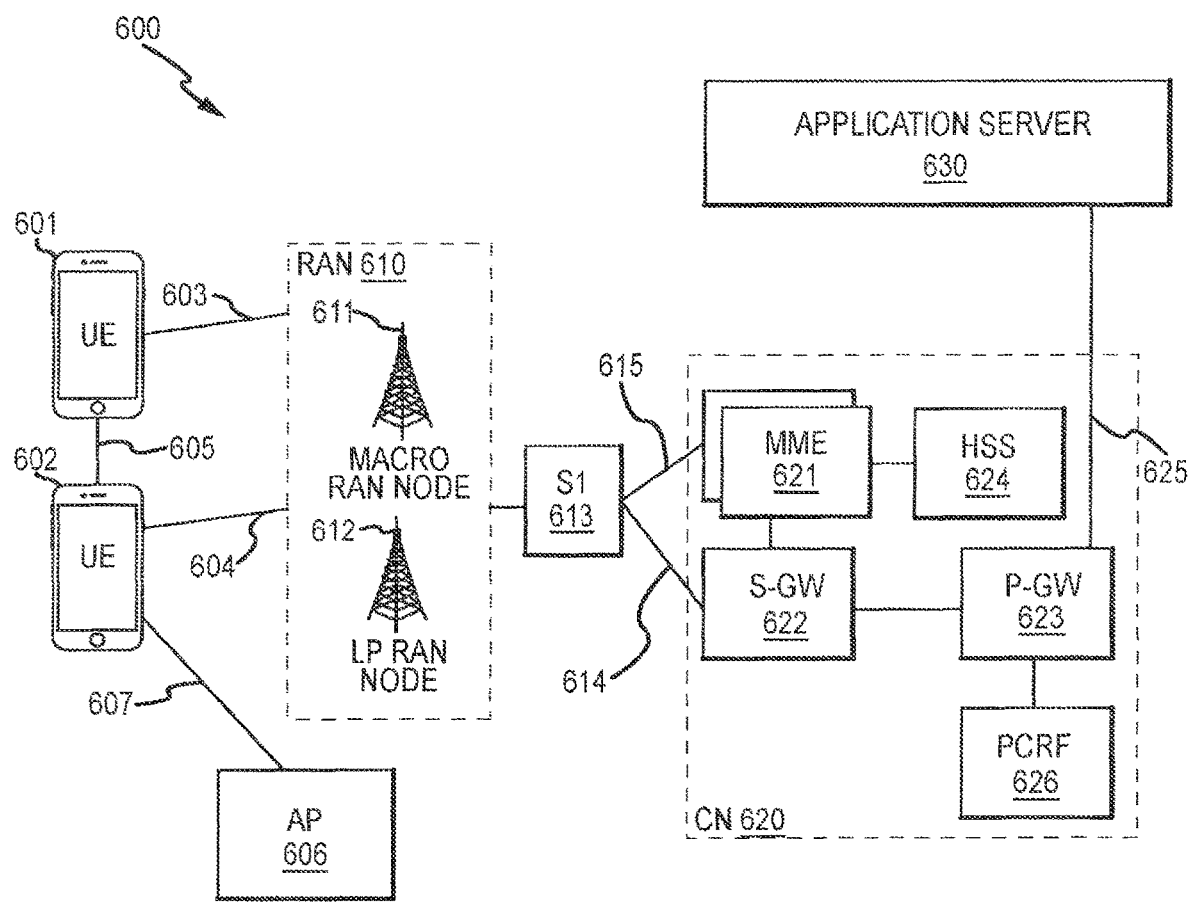
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements, in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined m LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an SI interface 613. In embodiments, the CN 620 may be an evolved packet core (EPC) network, a NextGen Packet Core (NPC) network, or some other type of CN. In this embodiment the SI interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
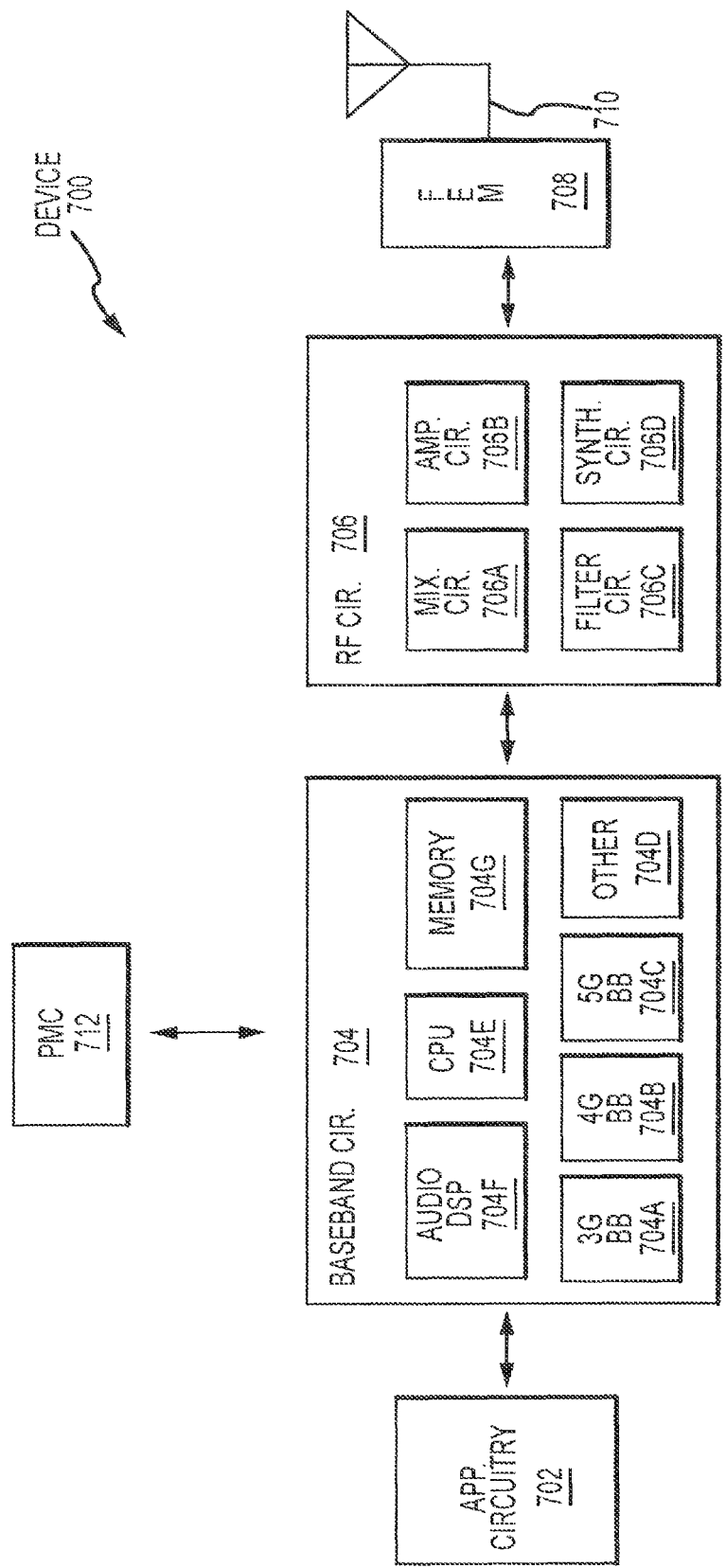
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU)

704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively.

In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect. In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. In other embodiments, however, the PMC 7 12 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
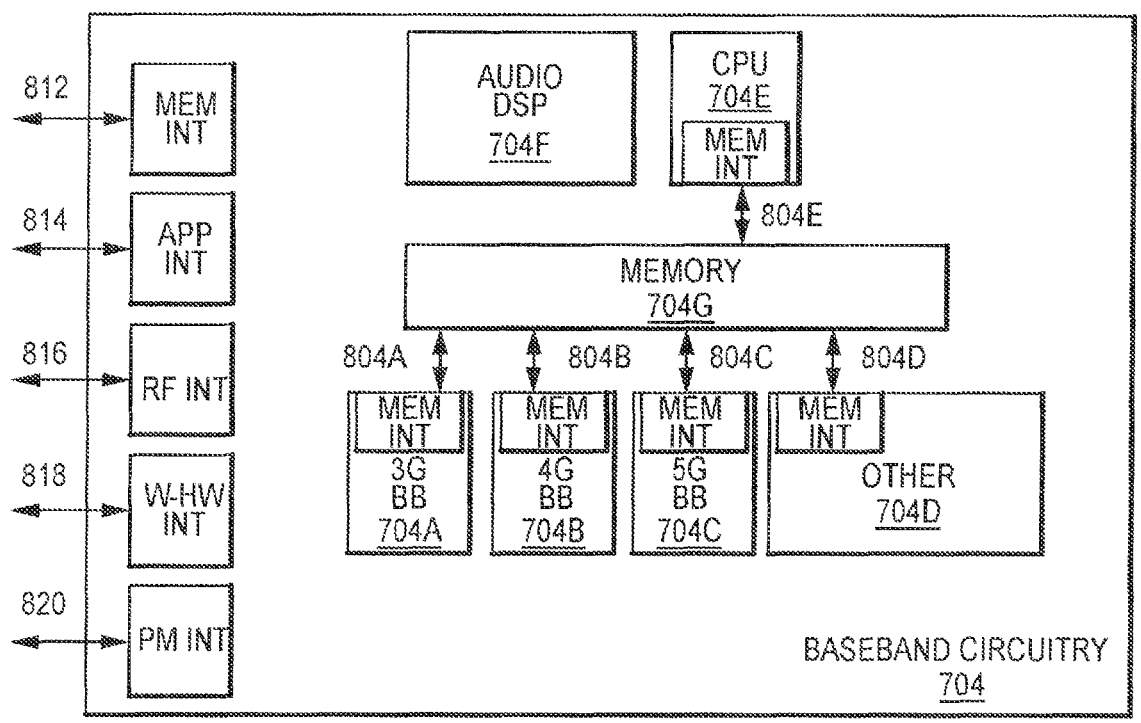
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

The following are example implementations of the subject matter described herein. It should be noted that any of the examples and the variations thereof described herein may be used in any permutation or combination of any other one or more examples or variations, although the scope of the claimed subject matter is not limited in these respects.

In example one, an apparatus of a user equipment (UE) comprises one or more baseband processors to receive one or more subframes from a cell of a network, and to detect a Cell Specific Reference Signal (CRS) transmission pattern in the one or more subframes to determine whether CRS mitigation is used by the cell, wherein the one or more baseband processors are to adjust processing of the one or more subframes when CRS mitigation is used, and a memory to store the one or more subframes. Example two may include the subject matter of example one or any of the examples described herein, wherein the cell comprises a serving cell or a neighboring cell. Example three may include the subject matter of example one or any of the examples described herein, wherein the one or more baseband processors are to adjust a radio resource management (RRM) procedure or a demodulation procedure when CRS mitigation is used. Example four may include the subject matter of example one or any of the examples described herein, wherein determination whether CRS mitigation is used by the cell comprises: estimating CRS Reference Signal Received Power (RSRP) on a center set of physical resource blocks (PRBs) (RSRP_IN) and estimating CRS RSRP on an outer set of PRBs (RSRP_OUT) for the one or more subframes, and determining that CRS mitigation is used by the cell when RSRP_IN is greater than RSRP_OUT plus a margin. Example five may include the subject matter of example one or any of the examples described herein, wherein said estimating RSRP_OUT does not include the center set of PRBs. Example six may include the subject matter of example one or any of the examples described herein, wherein said estimating RSRP_OUT comprises a wideband RSRP measurement that includes one or more of the center set of physical resource blocks (PRBs). Example seven may include the subject matter of example one or any of the examples described herein, wherein determination whether CRS mitigation is used by the cell comprises: reconstructing a first CRS signal in frequency domain for an outer set of physical resource blocks (PRBs) (CRS Signal 1) of the one or more subframes and reconstructing a second CRS signal (CRS Signal 2) in frequency domain for a full bandwidth of the one or more subframes, and performing a cross-correlation or a partial cross-correlation using CRS Signal 1 or CRS Signal 2, wherein CRS mitigation is used by the cell if no cross-correlation peak is found, or CRS mitigation is not used by the cell if a cross-correlation peak is found. Example eight may include the subject matter of example one or any of the examples described herein, wherein the one or more baseband processors are to perform the cross-correlation or the partial cross-correlation with CRS Signal 1 and a modified receive signal comprise a receive signal with a nulled center set of physical resource blocks (PRBs). Example nine may include the subject matter of example one or any of the examples described herein, wherein the one or more baseband processors are to perform the cross-correlation or the partial cross-correlation with CRS Signal 2 with a full receive signal. Example ten may include the subject matter of example one or any of the examples described herein, wherein the first CRS signal and the second CRS signal are reconstructed in time domain instead of frequency domain. Example eleven may include the subject matter of example one or any of the examples described herein, wherein the one or more baseband processors are to adjust processing of the one or more subframes when CRS signals are not transmitted in the outer physical resource blocks (PRBs) of the one or more subframes. Example twelve may include the subject matter of example one or any of the examples described herein, wherein the one or more baseband processors are to disable CRS interference mitigation (CRS-IM) processing in physical resource blocks (PRBs) without CRS signals when CRS mitigation is detected for the one or more subframes. Example thirteen may include the subject matter of example one or any of the examples described herein, wherein the one or more baseband processors are to disable CRS interference mitigation (CRS-IM) processing in all physical resource blocks (PRBs) when CRS mitigation is detected for the one or more subframes. Example fourteen may include the subject matter of example one or any of the examples described herein, wherein the one or more baseband processors are to disable network assisted interference cancellation and suppression (NAICS) receiver processing in physical resource blocks (PRBs) without CRS signals when CRS mitigation is detected for the one or more subframes. Example fifteen may include the subject matter of example one or any of the examples described herein, wherein the one or more baseband processors are to perform radio resource management (RRM) measurements including reference signal received power (RSRP) or reference signal received quality (RSRQ) on a neighboring cell using only physical resource blocks (PRBs) having CRS signals when CRS mitigation is detected for the one or more subframes. Example sixteen may include the subject matter of example one or any of the examples described herein, wherein the one or more baseband processors are to perform radio link monitoring (RLM) on a neighboring cell using only physical resource blocks (PRBs) having CRS signals when CRS mitigation is detected for the one or more subframes.

In example seventeen, an apparatus of an evolved NodeB (eNB) comprises one or more baseband processors to send an indication to a user equipment (UE) whether a cell of a network can use Cell Specific Reference Signal (CRS) mitigation on one or more subframes transmitted by the cell, and a memory to store the indication. Example eighteen may include the subject matter of example seventeen or any of the examples described herein, wherein the cell comprises a serving cell or a neighboring cell. Example nineteen may include the subject matter of example seventeen or any of the examples described herein, wherein the indication is sent to the UE in a semi-static manner including via radio resource control (RCC) signaling, and the one or more baseband processors are to dynamically switch on or switch off CRS transmissions. Example twenty may include the subject matter of example seventeen or any of the examples described herein, wherein the indication is sent to the UE in a dynamic manner including via downlink control information (DCI), and wherein the indication includes information on the exact resources where CRS mitigation is applied and on a set of the one or more subframes where CRS mitigation is applied. Example twenty-one may include the subject matter of example seventeen or any of the examples described herein, wherein the indication includes a maximum number of warm up subframes before an event, or a maximum number of cool down subframes after an event, wherein warm up subframes and cool down subframes comprise full bandwidth CRS subframes. Example twenty-two may include the subject matter of example seventeen or any of the examples described herein, wherein the event comprises a paging occasion, an SI reading window, a paging transmission window during extended discontinuous reception (eDRX), an active time in Connected DRX (C-DRX) for the UE, a Positioning Reference Signal (PRS) transmission, a random-access channel (RACH) occasion, or a scheduling request transmission, or a combination thereof. Example twenty-three may include the subject matter of example seventeen or any of the examples described herein, wherein the indication is sent by dedicated radio resource control (RRC) signaling or by broadcasting in a system information block (SIB).

In example twenty-four, one or more machine-readable media have instructions thereon that, when executed by an apparatus of a user equipment (UE), result in receiving one or more subframes from a cell of a network, detecting a Cell Specific Reference Signal (CRS) transmission pattern in the one or more subframes to determine whether CRS mitigation is used by the cell, and adjusting processing of the one or more subframes when CRS mitigation is used. Example twenty-five may include the subject matter of example twenty-four or any of the examples described herein, wherein the cell comprises a serving cell or a neighboring cell. Example twenty-six may include the subject matter of example twenty-four or any of the examples described herein, wherein the instructions, when executed, further result in adjusting a radio resource management (RRM) procedure or a demodulation procedure when CRS mitigation is used. Example twenty-seven may include the subject matter of example twenty-four or any of the examples described herein, wherein the instructions, when executed, further result in determining whether CRS mitigation is used by the cell comprises by: estimating CRS Reference Signal Received Power (RSRP) on a center set of physical resource blocks (PRBs) (RSRP_IN) and estimating CRS RSRP on an outer set of PRBs (RSRP_OUT) for the one or more subframes, and determining that CRS mitigation is used by the cell when RSRP_IN is greater than RSRP_OUT plus a margin.

In example twenty-eight, one or more machine-readable media have instructions thereon that, when executed by an apparatus of an evolved NodeB (eNB), result in encoding an indication to a user equipment (UE) whether a cell of a network can use Cell Specific Reference Signal (CRS) mitigation on one or more subframes transmitted by the cell, and sending the indication to the UE by dedicated radio resource control (RRC) signaling or by broadcasting in a system information block (SIB). Example twenty-nine may include the subject matter of example twenty-eight or any of the examples described herein, wherein the indication is sent to the UE in a semi-static, wherein the instructions, when executed, further result in dynamically switching on or switching off CRS transmissions. Example thirty may include the subject matter of example twenty-eight or any of the examples described herein, wherein the indication is sent to the UE in a dynamic manner including via downlink control information (DCI), and wherein the indication includes information on the exact resources where CRS mitigation is applied and on a set of the one or more subframes where CRS mitigation is applied. In example thirty-one, machine-readable storage includes machine-readable instructions, when executed, to realize an apparatus as recited in any preceding example.

In the description herein and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the description herein and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to network based CRS mitigation and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
   radio frequency (RF) circuitry configured to communicate with a network; and
   a processor communicatively coupled to the RF circuitry and configured to perform operations, comprising:
     receiving system information from a cell of the network, the system information indicating that Cell Specific Reference Signal (CRS) muting is to be used by the cell;
     receiving one or more subframes from the cell of the network, wherein a CRS transmission pattern in the one or more subframes is over a full bandwidth of the cell when the CRS muting is not used and the CRS transmission pattern in the one or more subframes is over a center six physical resources blocks (PRBs) of the full bandwidth of the cell when the CRS muting is used;
     estimating CRS Reference Signal Received Power (RSRP) on a center set of physical resource blocks (PRBs) (RSRP IN) and estimating CRS RSRP on an outer set of PRBs (RSRP OUT) for the one or more subframes; and
     determining that CRS mitigation is used by the cell when RSRP IN is greater than RSRP OUT plus a margin.

2. The apparatus of claim 1, wherein the cell comprises a serving cell or a neighboring cell.

3. The apparatus of claim 1, wherein a radio resource management (RRM) procedure or a demodulation procedure is adjusted when CRS muting is used.

4. The apparatus of claim 1, wherein said estimating RSRP OUT does not include the center set of PRBs.

5. The apparatus of claim 1, wherein said estimating RSRP OUT comprises a wideband RSRP measurement that includes one or more of the center set of physical resource blocks (PRBs).

6. The apparatus of claim 1, wherein the processor is to adjust processing of the one or more subframes when CRS signals are not transmitted in the outer physical resource blocks (PRBs) of the one or more subframes.

7. The apparatus of claim 1, wherein the processor is to disable CRS interference mitigation (CRS-IM) processing in physical resource blocks (PRBs) without CRS signals when CRS mitigation is detected for the one or more subframes.

8. The apparatus of claim 1, wherein network assisted interference cancellation and suppression (NAICS) receiver processing is disabled in physical resource blocks (PRBs) without CRS signals when CRS mitigation is detected for the one or more subframes.

9. The apparatus of claim 1, wherein radio resource management (RRM) measurements including reference signal received power (RSRP) or reference signal received quality (RSRQ) are performed on a neighbor cell using only physical resource blocks (PRBs) having CRS signals when CRS muting is detected for the one or more subframes.

10. The apparatus of claim 1, wherein the radio link monitoring (RLM) on a neighbor cell is performed using only physical resource blocks (PRBs) having CRS signals when CRS muting is detected for the one or more subframes.

11. An apparatus of a user equipment (UE), comprising:
radio frequency (RF) circuitry configured to communicate with a network; and
a processor communicatively coupled to the RF circuitry and configured to perform operations, comprising:
receiving system information from a cell of the network, the system information indicating that Cell Specific Reference Signal (CRS) muting is to be used by the cell;
receiving one or more subframes from the cell of the network, wherein a CRS transmission pattern in the one or more subframes is over a full bandwidth of the cell when the CRS muting is not used and the CRS transmission pattern in the one or more subframes is over a center six physical resources blocks (PRBs) of the full bandwidth of the cell when the CRS muting is used;
reconstructing a first CRS signal in frequency domain for an outer set of physical resource blocks (PRBs) (CRS Signal 1) of the one or more subframes and reconstructing a second CRS signal (CRS Signal 2) in frequency domain for a full bandwidth of the one or more subframes; and
performing a cross-correlation or a partial cross-correlation using CRS Signal 1 or CRS Signal 2, wherein CRS muting is used by the cell if no cross-correlation peak is found, or CRS muting is not used by the cell if a cross-correlation peak is found.

12. The apparatus of claim 11, wherein the processor is to perform the cross-correlation or the partial cross-correlation with CRS Signal 1 and a modified receive signal comprise a receive signal with a nulled center set of physical resource blocks (PRBs).

13. The apparatus of claim 11, wherein the processor is to perform the cross-correlation or the partial cross-correlation with CRS Signal 2 with a full receive signal.

14. The apparatus of claim 11, wherein the first CRS signal and the second CRS signal are reconstructed in time domain instead of frequency domain.

15. An apparatus of a base station comprising:
radio frequency (RF) circuitry configured to communicate with a user equipment (UE); and
a processor communicatively coupled to the RF circuitry and configured to perform operations, comprising:
transmitting system information, the system information indicating that Cell Specific Reference (CRS) muting is to be used by the base station;
transmitting information in one or more subframes to the UE, wherein a CRS transmission pattern in the one or more subframes is over a full bandwidth of the base station when the CRS muting is not used and the CRS transmission pattern in the one or more subframes is over a center six physical resources blocks (PRBs) of the full bandwidth of the base station when the CRS muting is used;
estimating CRS Reference Signal Received Power (RSRP) on a center set of physical resource blocks (PRBs) (RSRP IN) and estimating CRS RSRP on an outer set of PRBs (RSRP OUT) for the one or more subframes; and
determining that CRS mitigation is used by the cell when RSRP IN is greater than RSRP OUT plus a margin.

16. The apparatus of claim 15, wherein the base station is a serving cell or a neighboring cell to the UE.

17. The apparatus of claim 15, wherein the processor dynamically switches on or switches off CRS transmissions.

* * * * *